United States Patent
Ozaki et al.

(10) Patent No.: US 9,905,141 B2
(45) Date of Patent: Feb. 27, 2018

(54) IMAGE OUTPUT APPARATUS AND COMPUTER-READABLE RECORDING MEDIUM

(71) Applicants: Hiroki Ozaki, Tokyo (JP); Hiroki Mori, Kanagawa (JP); Ryo Iwasaki, Kanagawa (JP); Miki Oouchi, Kanagawa (JP); Rie Nakamura, Kanagawa (JP); Hiroshi Maeda, Kanagawa (JP); Shigeyuki Ishii, Kanagawa (JP)

(72) Inventors: Hiroki Ozaki, Tokyo (JP); Hiroki Mori, Kanagawa (JP); Ryo Iwasaki, Kanagawa (JP); Miki Oouchi, Kanagawa (JP); Rie Nakamura, Kanagawa (JP); Hiroshi Maeda, Kanagawa (JP); Shigeyuki Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 353 days.

(21) Appl. No.: 14/036,197

(22) Filed: Sep. 25, 2013

(65) Prior Publication Data

US 2014/0118326 A1    May 1, 2014

(30) Foreign Application Priority Data

Oct. 25, 2012    (JP) ................. 2012-235931

(51) Int. Cl.
*G06F 1/32*    (2006.01)
*G09G 3/00*    (2006.01)
*H04N 21/41*    (2011.01)

(52) U.S. Cl.
CPC ............. *G09G 3/00* (2013.01); *G06F 1/3209* (2013.01); *G06F 1/3265* (2013.01);
(Continued)

(58) Field of Classification Search
CPC ..... G06F 1/3265; G06F 1/3209; H04N 5/268; G03G 15/5004; G03G 15/80; G03G 15/55; G03G 15/5087; G09G 3/00
See application file for complete search history.

(56) References Cited

U.S. PATENT DOCUMENTS 5,706,110 A    1/1998 Nykanen
5,944,831 A    8/1999 Pate et al.
(Continued)

FOREIGN PATENT DOCUMENTS

CN    2011-66675    12/2008
EP    0508685 A2    10/1992
(Continued)

OTHER PUBLICATIONS

European Search Report dated Dec. 20, 2013 in corresponding European patent application No. 13 18 4134.8.
(Continued)

*Primary Examiner* — Xuemei Zheng
(74) *Attorney, Agent, or Firm* — Cooper & Dunham LLP

(57) ABSTRACT

An image output apparatus is disclosed that is capable of switching between a normal status and a low power status in which consumption power is lower than that in the normal status. The image output apparatus includes an interface for acquiring an image signal; a signal detector configured to detect a signal at the interface; and a switching controller configured to switch a status from the low power status to the normal status based on a detection result of the signal in the low power status.

6 Claims, 6 Drawing Sheets

(52) U.S. Cl.
CPC ....... *H04N 21/4113* (2013.01); *Y02B 60/1242* (2013.01); *Y02B 60/32* (2013.01)

(56) References Cited

U.S. PATENT DOCUMENTS

| | | | | |
|---|---|---|---|---|
| 6,141,000 | A * | 10/2000 | Martin | G03B 21/132 178/18.03 |
| 8,095,814 | B2 * | 1/2012 | O'Connell | G06F 1/3209 713/300 |
| 8,780,274 | B2 * | 7/2014 | Hiroki | G03B 21/14 348/552 |
| 9,235,257 | B2 * | 1/2016 | Richardson | G06F 1/325 |
| 2004/0025188 | A1 | 2/2004 | Bertin et al. | |
| 2005/0108584 | A1 | 5/2005 | Kawakami et al. | |
| 2008/0229132 | A1 | 9/2008 | Suga et al. | |
| 2009/0083560 | A1 * | 3/2009 | O'Connell | G06F 1/3209 713/323 |
| 2010/0241889 | A1 | 9/2010 | Fu et al. | |
| 2011/0090405 | A1 * | 4/2011 | Hiroki | G03B 21/14 348/705 |
| 2013/0106908 | A1 * | 5/2013 | Ichieda | G06F 3/0425 345/629 |
| 2013/0176497 | A1 | 7/2013 | Kawai et al. | |
| 2013/0258372 | A1 * | 10/2013 | Murray | G03G 15/5004 358/1.13 |
| 2013/0297958 | A1 * | 11/2013 | Siegel | G06F 1/325 713/323 |

FOREIGN PATENT DOCUMENTS

| | | |
|---|---|---|
| EP | 0722231 A1 | 7/1996 |
| FR | 2810833 | 12/2001 |
| JP | 2007-148594 | 6/2007 |
| JP | 2007-219164 | 8/2007 |
| JP | 2008-089886 | 4/2008 |
| JP | 2013-142706 | 7/2013 |
| TW | 2012-13773 | 4/2012 |
| WO | WO2005/094055 A1 | 10/2005 |

OTHER PUBLICATIONS

Oct. 5, 2016 European official action in connection with corresponding European patent Application No. 13184134.8.

Aug. 16, 2016 Japanese official action in connection with corresponding Japanese patent Application No. 2012-235931.

* cited by examiner

| PRIORITY ORDER | IMAGE SIGNAL INPUT I/F |
|---|---|
| 1 | 103a |
| 2 | 103b |
| 3 | 103c |
| ⋮ | ⋮ |

IMAGE OUTPUT APPARATUS AND COMPUTER-READABLE RECORDING MEDIUM

FIELD

The present invention is related to an image output apparatus, etc.

BACKGROUND

Japanese Laid-open Patent Publication No. 2008-89886 discloses an image projection display apparatus such as a projector, etc., that projects an image on a projection surface such as a screen, etc., according to an image signal input from an external device connected thereto such as a PC (Personal Computer), a USB (Universal Serial Bus) memory, etc., in order to display information for a plurality of persons at meetings, lectures, presentations, etc.

When a user uses such an image projection display apparatus, the user needs to connect the external device to the image projection display apparatus and perform an operation for turning on the image projection display apparatus. Thus, when a user uses such an image projection display apparatus, there is a problem that the user feels inconvenience because the user needs to separately perform the operation for connecting the external device to the image projection display and the operation for turning on the image projection display apparatus. It is noted that such a problem may occur not only in the image projection display apparatus such as a projector, etc., but also in another image output apparatus such as a television receiver, a PC, a digital camera, a video camera, a display panel, etc.

SUMMARY

According to one aspect of the embodiment, an image output apparatus is provided that is capable of switching between a normal status and a low power status in which consumption power is lower than that in the normal status, the image output apparatus comprising:

an interface for acquiring an image signal;

a signal detector configured to detect a signal at the interface; and a switching controller configured to switch a status from the low power status to the normal status based on a detection result of the signal in the low power status.

DESCRIPTION OF EMBODIMENTS

In the following, embodiments of the present invention will be described with reference to the accompanying drawings. In an embodiment, as an image output apparatus, an image projection display apparatus such as a projector, etc., is explained. The image projection display apparatus modulates a light bundle emitted from a light source according to an image signal input from an external device connected thereto such as a PC (Personal Computer), a USB (Universal Serial Bus) memory, etc., to form an optical image, and projects the formed optical image in an enlarged manner on a projection surface such as a screen, etc. It is noted that the image projection display apparatus according to the embodiment is configured such that its power status can be switched between a power ON status and a power OFF status.

In the power ON status, power is turned on, and an operation instruction such as an output of an image signal, etc., can be performed immediately. Further, the power ON status includes a standby status in which an acceptance of an operation is possible. In contrast, in the power OFF status, power is not turned on, although the power is supplied from a power supply. In the power OFF status, power is not applied to most parts of the apparatus. Thus, the power OFF status includes a standby status in which consumption power is lower than that in the power ON status. In the embodiment, the power ON status corresponds to a normal status, and the power OFF status corresponds to a low power status.

Further, the image projection display apparatus according to the embodiment is at least capable of accepting a power on operation and detecting a signal from an external device connected thereto. The image projection display apparatus according to the embodiment transfers to the power ON status when it accepts the power on operation. It is noted that the image projection display apparatus according to the embodiment is in a power breaking status if the power is not supplied from the power supply. In the power breaking status, the image projection display apparatus does not accept any operations.

With respect to the image projection display apparatus thus configured, one of features is that it automatically transfers to the power ON status when it detects a signal from the external device connected thereto in the power OFF status. Thus, according to the image projection display apparatus of the embodiment, when a user desires to use the image projection display apparatus, which is in the power OFF status, to project an image, it is possible for the user to make the image projection display apparatus transfer to the power ON status without performing the power on operation, which increases convenience for the user. In the following, this feature is explained in detail.

Figure 1:
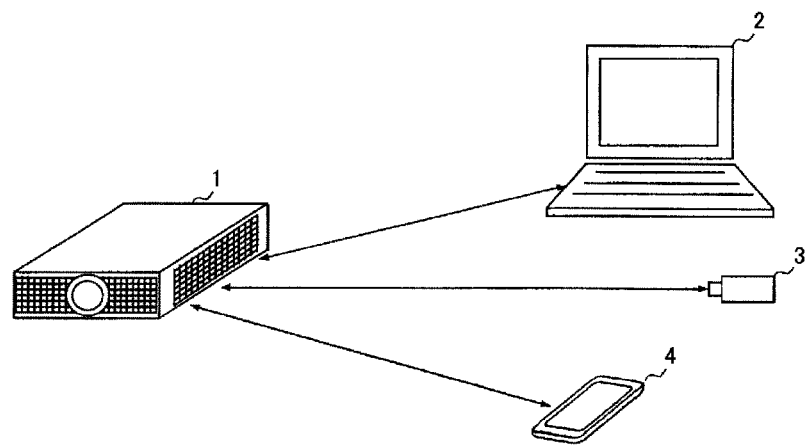
FIG. 1 is a diagram for illustrating an example of an operating status of an image projection display apparatus according to an embodiment of the present invention.

At first, an operating manner of the image projection display apparatus 1 according to the embodiment is described with reference to FIG. 1. FIG. 1 is a diagram for illustrating an example of an operating status of the image projection display apparatus 1 according to an embodiment of the present invention. As illustrated in FIG. 1, to the image projection display apparatus 1 according to the embodiment are connected external devices that include an information processing terminal 2 such as a desktop PC and a mobile PC, etc., a portable recording medium 3 such as a USB memory and an SD (Secure Digital) memory card, etc., and a portable information terminal 4 such as a smart phone, a tablet terminal, a PDA (Personal Data Assistance), etc. The image projection display apparatus 1 projects the image on a projection surface such as a screen based on the image signal input from any of these external devices. It is noted that in the embodiment the image includes a freeze-frame picture and a moving video picture.

It is noted that the portable recording medium 3 is connected to the image projection display apparatus 1 by directly inserting its connection terminal to a communication interface of the image projection display apparatus 1. The information processing terminal 2 and the portable information terminal 4 are physically and directly connected to the image projection display apparatus 1 with various communication cables such as a USB cable, RS232C (Recommended standard 232 version C) cable, a VGA (Video Graphics Array) cable and an HDMI (High Definition Multimedia Interface) cable, etc., or via a network line such as a LAN (Local Area Network), a WAN (Wide Area Network), etc., and short range wireless communication such as infrared communication, Bluetooth (registered trademark), etc.

Figure 2:
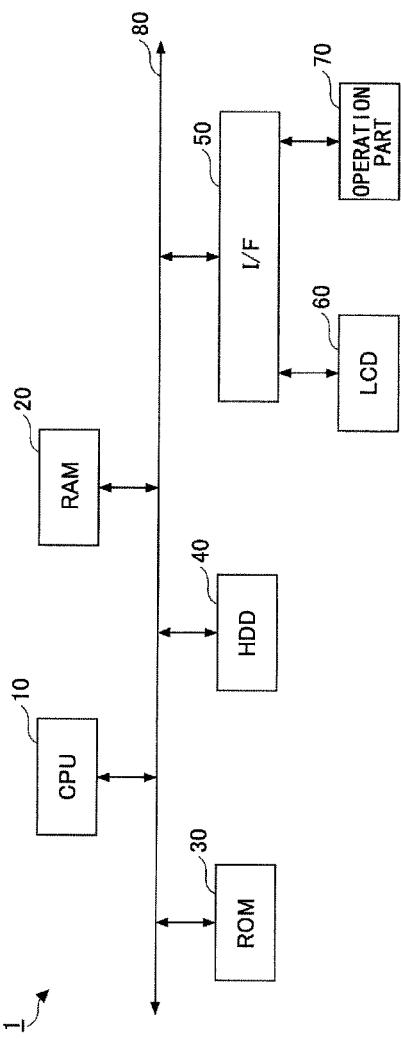
FIG. 2 is a block diagram for schematically illustrating a hardware configuration of the image projection display apparatus according to the embodiment of the present invention.
Figure 3:
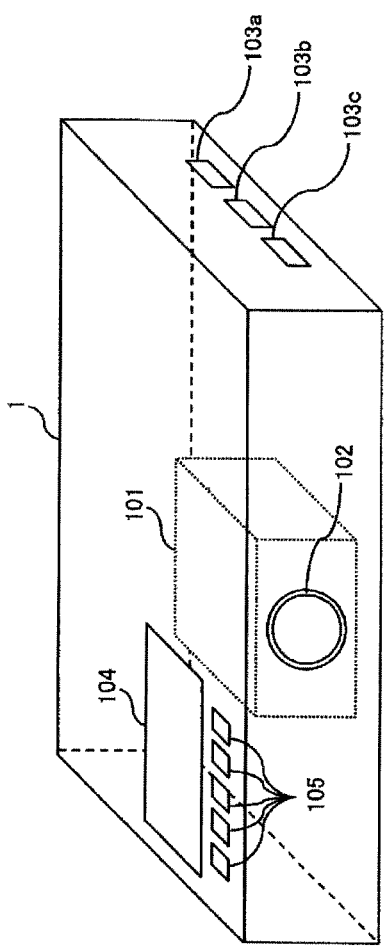
FIG. 3 is a perspective view of the image projection display apparatus according to the embodiment of the present invention viewed from an upper side.

Next, a hardware configuration of the image projection display apparatus 1 according to the embodiment is described with reference to FIG. 2 and FIG. 3. FIG. 2 is a block diagram for schematically illustrating a hardware configuration of the image projection display apparatus 1 according to the embodiment. FIG. 3 is a perspective view of the image projection display apparatus 1 according to the embodiment of the present invention viewed from an upper side. It is noted that the image projection display apparatus 1 includes, in addition to the hardware configuration illustrated in FIG. 2, an optical mechanism for projecting the image on the screen.

As illustrated in FIG. 2, the image projection display apparatus 1 according to the embodiment includes the same configuration as an ordinary server, an ordinary PC, etc. Specifically, the image projection display apparatus 1 according to the embodiment includes a CPU (Central Processing Unit) 10, a RAM (Random Access Memory) 20, a ROM (Read-Only Memory) 30, a HDD (Hard Disk Drive) 40 and an I/F 50 that are connected via a bus 80. Further, the I/F 50 is connected to an LCD (Liquid Crystal Display) 60 and an operation part 70.

The CPU 10 is a computing unit that controls the operation of the image projection display apparatus 1 as a whole. The RAM 20 is a volatile storage device from which information can be read at high speed and to which information can be written at high speed. The RAM 20 is used as a working area when the CPU 10 processes the information. The ROM 30 is a non-volatile read-only storage device in which programs such as firmware, etc., are stored. The HDD 40 is a non-volatile readable and writable storage device in which an OS (Operating System), control programs, application programs, etc., are stored.

The I/F 50 connects the bus 80 to the hardware resources, the networks, etc., to control them. The LCD 60 is a visual interface for the user to confirm the status of the image projection display apparatus 1. The operation part 70 is a user interface such as a keyboard, a mouth, etc., used by the user to input information to the image projection display apparatus 1.

According to such a hardware configuration, a software controller is implemented when the program stored in the ROM 30, HDD 40 or a recording medium (not illustrated) such as an optical disk, etc., is read into the RAM 20, and the CPU 20 performs the computation according to the program loaded in the RAM 20. With a combination of the software controller thus implemented and the hardware resources, a functional block for the functions of the image projection display apparatus 1 according to the embodiment is implemented.

Further, as illustrated in FIG. 3, the image projection display apparatus 1 according to the embodiment includes an optical engine 101, a projector lens 102, an image signal input terminal 103a, an image signal input terminal 103b, an image signal input terminal 103c, a display panel 104 and operation switches 105.

The optical engine 101 includes a light source and a light modulating part (not illustrated). The optical engine 101 projects the image in an enlarged manner on the projection surface such as a screen, etc., from the projector lens 102 according to the control of an optical engine controller 180 described hereinafter. It is noted that the light source includes a lamp (not illustrated) to emit a light bundle to the light modulating part. The light modulating part modulates the light bundle from the light source according to the image signal input from any of the external devices 2 through 4 to form an optical image and emit it to the projector lens 102. The projector lens 102 projects the optical image, which is formed by modulating the light bundle from the light source at the light modulating part, in an enlarged manner on the projection surface such as a screen, etc.

The image signal input terminal (I/F) 103a, the image signal input terminal (I/F) 103b and the image signal input terminal (I/F) 103c are connected to the external devices to input the image signals to the image projection display apparatus 1. In the embodiment, to the image signal input terminal 103a is connected to the information processing terminal 2, to the image signal input terminal 103b is connected to the portable recording medium 3, and to the image signal input terminal 103c is connected to the portable information terminal 4. In the following, the image signal input terminal 103a, the image signal input terminal 103b and the image signal input terminal 103c are referred to as an "image signal input I/F 103" when there is no necessity to distinguish them.

It is noted that the image signal input I/F 103 may be the USB, a mini D-sub 15 pin, the RS-232C, the HDMI, the short range wireless communication such as the infrared communication interface, Bluetooth (registered trademark) interface, etc., and an interface such as an Ethernet (registered trademark) physical layer, etc. The image signal input I/F 103 is implemented by the I/F 50 illustrated in FIG. 2.

The display panel 104 is an output interface for visually displaying the status of the image projection display apparatus 1 as well as an input interface as a touch panel for the user to directly operate the image projection display apparatus 1 or to input information to the image projection display apparatus 1. In other words, the display panel 104 includes a function of displaying an image for accepting operations by the user. It is noted that the display panel 104 is implemented by the LCD 60 and the operation part 70 illustrated in FIG. 2. The operation switch 105 is an input interface for the user to directly operate the image projection display apparatus 1 or to input information to the image projection display apparatus 1. The operation switch 105 is a mechanical operation part such as a hard switch, etc. It is noted that the operation switch 105 is implemented by the operation part 70 illustrated in FIG. 2.

Figure 4:
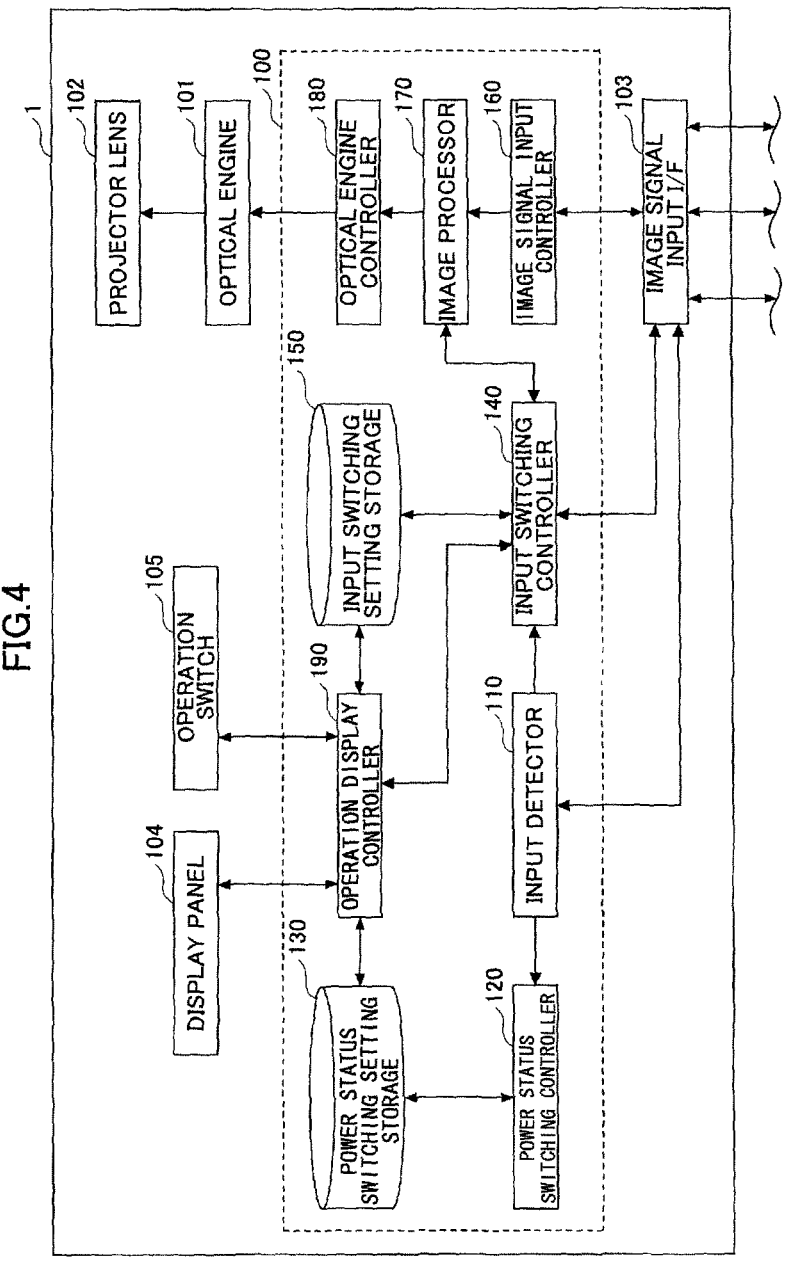
FIG. 4 is a diagram for schematically illustrating an example of a functional configuration of the image projection display apparatus according to the embodiment of the present invention.

Next, a functional configuration of the image projection display apparatus 1 according to the embodiment is described with reference to FIG. 4. FIG. 4 is a block diagram for schematically illustrating a functional configuration of the image projection display apparatus 1 according to the embodiment. It is noted that in FIG. 4, an electrical connection is indicated by a solid arrow. As illustrated in FIG. 4, the image projection display apparatus 1 according to the embodiment includes a controller 100, in addition to the optical engine 101, the projector lens 102, the image signal input terminals 103, the display panel 104 and the operation switch 105.

The controller 100 is configured by a combination of a software resource and a hardware resource. Specifically, the controller 100 is configured by a software controller and a hardware resource such as an integrated circuit, etc. The software controller is implemented when the program stored in the ROM 30 or a non-volatile storage device such as a HDD 40, an optical disk is read to the volatile storage device such as a RAM 20, etc., and the CPU 20 performs the computation according to the program. The controller 100 functions as a controller for controlling the image projection display apparatus 1 as a whole.

Further, the controller 100 includes an input detector 110, a power status switching controller 120, a power status switching setting storage 130, an input switching controller 140, an input switching setting storage 150, an image signal input controller 160, an image processor 170, an optical engine controller 180 and an operation display controller 190.

The input detector 110 detects the signal of at least any one of the image signal input I/F 103, and generates a detection signal based on the detected signal to report it to the power status switching controller 120 and the input switching controller 140. In other words, in the embodiment, the input detector 110 functions as a signal detector. The signal includes a connection signal that represents that the external device is connected to the image signal input I/F 103, an image signal input from the external device via the image signal input I/F 103, and an input report signal that is supplied via the image signal input I/F 103 as a cue for inputting the image signal from the external device. It is noted that the connection signal may be input from the external device via image signal input I/F 103 or be an electric signal generated between the external device and the image signal input I/F 103 when they are connected.

Further, the detection signal includes a connection detection signal that represents that the input detector 110 detects the connection signal, an input detection signal that represents that the input detector 110 detects the image signal or the input report signal, an I/F related signal that represents information (referred to as "I/F related information", hereinafter) about the image signal input I/F 103 to which the external device is connected, and an image related signal represents information (referred to as "image related information", hereinafter) about the image signal input to the image signal input I/F 103 from the external device.

It is noted that the I/F related information is information that represents which image signal input I/F 103 detects the signal, in which order the image signal input I/Fs 103 detect the signals, etc., for example. The image related information is information that represents that the image file input as the image signal is broken, the image file input as the image signal is in a file format that is not supported, the image file input as the image signal cannot be output because it is encrypted, etc., for example.

Further, the input detector 110 generates as the signal the detection signal to report it to the power status switching controller 120 when it detects a connection cancel signal that represents that the connection signal is no longer detected because of the cancellation of the connection between the image signal input I/F 103 and the external device; it detects an input cancellation signal that represents that the image signal is no longer detected because of the cancellation of the input of the image signal from the external device via the image signal input I/F 103; and it detects an end report signal that is reported from the external device via the image signal input I/F 103 as a cue for ending the input of the image signal.

The detection signal generated at that time includes a connection cancel detection signal that represents that the input detector 110 detects the connection cancel signal, an end detection signal that represents that the input detector 110 detects the input cancellation signal or the end report signal. In the following, the connection cancel signal, the input cancellation signal and the end report signal are collectively referred to as an input end signal, and the connection cancel detection signal and the end detection signal are collectively referred to as an "input end detection signal".

The power status switching controller 120 performs, based on the detection signal reported from the input detector 110, a switching control of a power status according to a power status switching setting stored in the power status switching setting storage 130. In other words, in the embodiment, the power status switching controller 120 functions as a switching controller. The power status switching setting storage 130 stores the power status switching setting. The power status switching setting is related to the switching control of the power status by the power status switching controller 120.

The input switching controller 140 performs, based on the I/F related signal reported from the input detector 110, a switching control of the image signal input I/Fs 103 according to an input switching setting stored in the input switching setting storage 150. In other words, in the embodiment, the input switching controller 140 functions as an input interface determining part. Further, the input switching controller 140, if it determines, based on the image related signal reported from the input detector 110, that the image signal input from the image signal input I/F 103 is a file that cannot be output, generates an output disable image signal for projecting an output disable image in an enlarged manner from the optical engine 101 for informing such a fact, and inputs it to the image processor 170 and the operation display controller 190.

The input switching setting storage 150 stores the input switching setting. The input switching setting is related to the switching control of the image signal input I/Fs 103 by the input switching controller 140. It is noted that the power status switching setting stored in the power status switching setting storage 130 and the input switching setting stored in the input switching setting storage 150 can be changed, as appropriate, by the user's operation to the display panel 104, the operation switches 105, or a remote operation via the connected external device.

The image signal input controller 160 inputs the image signal, which is input via the image signal input I/F 103, to the image processor 170. The image processor 170 performs conversion processes of luminance and color components, etc., on the output disable image signal input from the input switching controller 140 or the image signal input from the image signal input controller 160 such that the output signal is suited for projecting the image from the optical engine 101 in an enlarged manner.

The optical engine controller 180 controls or drives the optical engine 101 according to the output signal input from the image processor 170. In other words, in the embodiment, the optical engine controller 180 functions as an image output controller. The optical engine controller 180 displays information on the display panel 104 or acquires information input via the display panel 104 and the operation switches 105. Further, the operation display controller 190 causes the display panel 104 to display the output disable image based on the output disable image signal input from the input switching controller 140.

With respect to the image projection display apparatus 1 thus configured, one of features is that it automatically transfers to the power ON status when it detects the signal from the external device connected thereto in the power OFF status. Thus, according to the image projection display apparatus 1 of the embodiment, when a user desires to use the image projection display apparatus, which is in the power OFF status, to project an image, it is possible for the user to make the image projection display apparatus transfer in the power ON status without taking the trouble to perform the power on operation, which increases convenience for the user.

Figure 5:
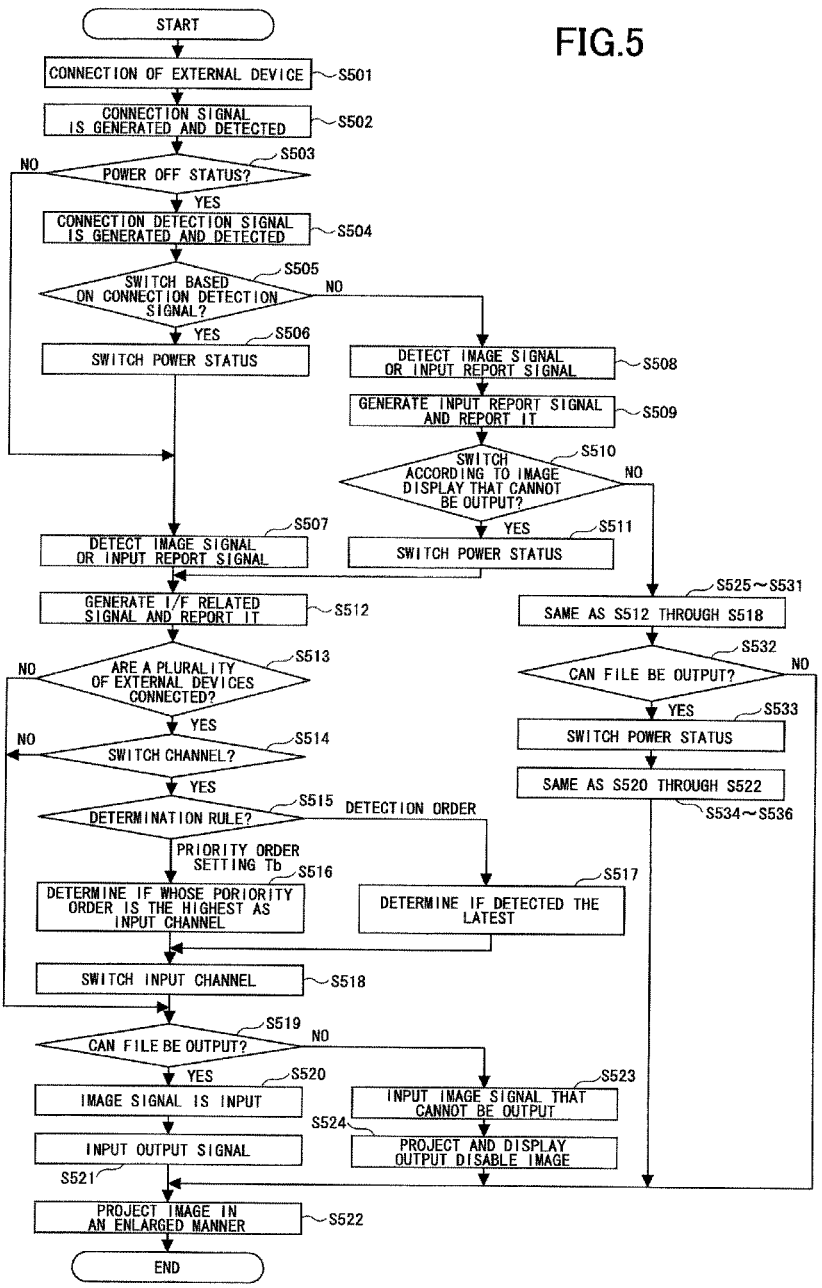
FIG. 5 is a flowchart for explaining a process executed when the image projection display apparatus according to the embodiment of the present invention projects an image.

Next, a process executed by the image projection display apparatus 1 according to the embodiment in projecting the image is described with reference to FIG. 5. FIG. 5 is a flowchart for explaining a process executed when the image projection display apparatus 1 according to the embodiment of the present invention projects the image.

As illustrated in FIG. 5, in projecting the image with the image projection display apparatus 1, at first, when the external device is connected to any one of the image signal input I/Fs 103 (S501), the input detector 110 detects the connection signal (S502) and determines whether the power status is the power OFF status or power ON status (S503).

If the input detector 110 determines in the determination process of S503 that the power status is the power OFF status (S503/YES), the input detector 110 generates the connection detection signal based on the detected connection signal to report it to the power status switching controller 120 (S504). On the other hand, the input detector 110 determines in the determination process of S503 that the power status is not the power OFF status (S503/NO), the input detector 110 performs processes from S507 described hereinafter.

The power status switching controller 120, when the connection detection signal is reported from the input detector 110 in the process of S504, refers to the power status switching setting stored in the power status switching setting storage 130 to determine whether to switch the power status from the power OFF status to the power ON status (S505). At that time, the power status switching controller 120 refers to determine whether the power status switching setting stored in the power status switching setting storage 130 is set such that the power status is switched from the power OFF status to the power ON status if the connection detection signal is reported, or the power status is not switched from the power OFF status to the power ON status even if the connection detection signal is reported and the power status is switched from the power OFF status to the power ON status if the input detection signal is reported.

Thus, according to the image projection display apparatus 1 of the embodiment, when it is detected that the external device is connected, the image projection display apparatus 1 automatically transfers in the power ON status without requiring the user to perform the power on operation, which increases convenience for the user.

If the power status switching controller 120 determines in the determination process of S505 that the power status is to be switched from the power OFF status to the power ON status (S505/YES), that is to say, if the power status switching setting stored in the power status switching setting storage 130 is set such that the power status is switched from the power OFF status to the power ON status if the connection detection signal is reported, the power status switching controller 120 controls the power status such that the power status is switched from the power OFF status to the power ON status (S506).

Then, the image projection display apparatus 1 according to the embodiment transfers from the power OFF status to the power ON status, and when the image signal is input from the external device via the image signal input I/F 103 or the input report signal is input from the external device via the image signal input I/F 103, the input detector 110 detects the image signal or the input report signal (S507).

If the power status switching controller 120 determines in the determination process of S505 that the power status is not to be switched from the power OFF status to the power ON status (S505/NO), that is to say, if the power status is not switched from the power OFF status to the power ON status even if the connection detection signal is reported and the power status is switched from the power OFF status to the power ON status if the input detection signal is reported, the power status switching controller 120 does not perform the switching control and thus keeps the image projection display apparatus 1 waiting in the power OFF status.

Then, the image projection display apparatus 1 according to the embodiment remains in the power OFF status, and when the image signal is input from the external device via the image signal input I/F 103 or the input report signal is input from the external device via the image signal input I/F 103, the input detector 110 detects the image signal or the input report signal (S508), and generates the input detection signal based on the detected image signal or the detected input report signal to report it to the power status switching controller 120 (S509).

The power status switching controller 120, when the input detection signal is reported from the input detector 110, refers to the power status switching setting stored in the power status switching setting storage 130 to determine whether to switch the power status from the power OFF status to the power ON status (S510). At that time, the power status switching controller 120 refers to determine whether the power status switching setting stored in the power status switching setting storage 130 is set such that, if the image file input as the image signal to be output is a file that cannot be output, the image representing such a fact is to be displayed or not. It is noted that, if the image file input as the image signal to be output is a file that cannot be output, whether the image representing such a fact is to be displayed or not can be set by the user. Thus, the setting can be changed according to a usage manner of the user, if appropriate.

If the power status switching controller 120 determines in the determination process of S510 that the power status is to be switched from the power OFF status to the power ON status (S510/YES), that is to say, if the power status switching setting stored in the power status switching setting storage 130 is set such that, if the image file input as the image signal to be output is a file that cannot be output, the image representing such a fact is to be displayed, the power status switching controller 120 controls the power status such that the power status is switched from the power OFF status to the power ON status (S511).

Thus, according to the image projection display apparatus 1 of the embodiment, when the image signal or the input report signal is input from the external device, the image projection display apparatus 1 automatically transfers in the power ON status without requiring the user to perform the power on operation, which increases convenience for the user.

The input detector 110 determines, based on the detected image signal or the detected input report signal, which image signal input I/F 103 detects the signal or in which order the image signal input I/Fs 103 detect the signals to generated the I/F related signal, and determines whether the image file input as the image signal is not broken or is not a file that cannot be output because of an unsupported file format, etc., to generate the image related signal. The input detector 110 reports the generated I/F related signal and the generated image related signal to the input switching controller 140 (S512).

The input switching controller 140, when the I/F related signal and the image related signal are reported from the input detector 110 in the process of S512, analyzes the reported I/F related signal to determine whether a plurality of the external devices are connected (S513).

If the input switching controller 140 determines in the determination process of S513 that a plurality of the external devices are connected (S513/YES), the input switching controller 140 refers to the input switching setting stored in the input switching setting storage 150 to determine whether the image signal input I/F 103 currently set as an input channel to which the image signal is to be input is to be switched to another image signal input I/F 103 (S514). At that time, the input switching controller 140 refers to determine whether the input switching setting stored in the input switching setting storage 150 is set such that, under a situation where a plurality of the external devices are connected, the input channel is to be switched from the currently set image signal input I/F 103 currently set to another image signal input I/F 103 or not. It is noted that whether the input channel is to be switched can be set by the user. Thus, the setting can be changed according to a usage manner of the user, if appropriate.

If the input switching controller 140 determines in the determination process of S514 that the input channel is to be switched from the currently set image signal input I/F 103 currently set to another image signal input I/F 103 (S514/YES), the input switching controller 140 refers to, based on the I/F related signal reported in the process of S512, the input switching setting stored in the input switching setting storage 150 to determine which image signal input I/F 103 the input channel is to be switched to (S515 through S517).

Figures 6, 7:
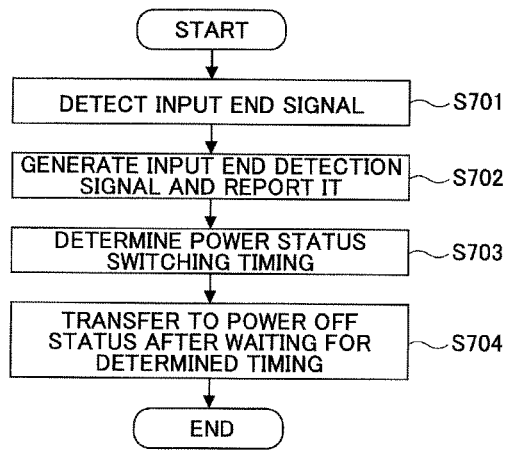
FIG. 6 is a diagram for illustrating an example of a data construction of a priority order setting Tb according to an embodiment of the present invention.
FIG. 7 is a flowchart for explaining a process executed when the image projection display apparatus according to the embodiment of the present invention transfers from a power ON status to a power OFF status.

The input switching controller 140 refers to determine whether the input switching setting stored in the input switching setting storage 150 is set such that the input channel is to be determined according to a priority order setting table (referred to as "a priority order setting Tb", hereinafter) or according to the order of the detection of the image signal or the input report signal by the input detector 110, to determine the rule with which the input channel is to be determined (S515). The priority order setting Tb is a table in which the priority order of the respective image signal input I/Fs 103 is set, as illustrated in FIG. 6. FIG. 6 is a diagram for illustrating an example of a data construction of the priority order setting Tb according to the embodiment. It is noted that the order in the priority order setting Tb can be changed by the user, if appropriate.

Then, if the input switching controller 140 determines in the determination process of S515 that the input switching setting stored in the input switching setting storage 150 is set such that the input channel is to be determined according to the priority order setting Tb (S515/priority order setting Tb), the input switching controller 140 determines the image signal input I/F 103 as the input channel which has the highest priority order set among the image signal input I/Fs 103 for which the input detector 110 detects the image signal or the input report signal (S516).

In this way, the image projection display apparatus 1 according to the embodiment can automatically switch the input channel according to the predetermined priority order, which increases convenience for the user in switching the input channel. Further, it becomes possible to switch the input channel to the image signal input I/F 103 suited for the user.

Further, in this way, according to the image projection display apparatus 1 of the embodiment, the order in the priority order setting Tb can be changed by the user, if appropriate. Thus, it becomes possible to switch the input channel to an optimal image signal input I/F 103 according to a usage manner of the user.

On the other hand, if the input switching controller 140 determines in the determination process of S515 that the input switching setting stored in the input switching setting storage 150 is set such that the input channel is to be determined according to the order of the image signal or the input report signal input to the image signal input I/Fs 103 (S515/NO), the input switching controller 140 determines the image signal input I/F 103 as the input channel for which the input detector 110 detects the image signal or the input report signal the latest (S517).

It is noted that if the input switching setting stored in the input switching setting storage 150 is set such that the input channel is to be determined according to the order of the image signal or the input report signal input to the image signal input I/Fs 103, the input switching controller 140 may determine the image signal input I/F 103 as the input channel for which the input detector 110 detects the image signal or the input report signal at a particular order, instead of determining the image signal input I/F 103 as the input channel for which the input detector 110 detects the image signal or the input report signal the latest.

In this way, the image projection display apparatus 1 according to the embodiment can automatically switch the input channel according to the predetermined particular order of the image signal or the input report signal detected by the image signal input I/Fs 103, which increases convenience for the user in switching the input channel.

It is noted that, with respect to a rule for the determination process of S515 in switching the input channel, the image signal input I/F 103 that triggers the power status of the image projection display apparatus 1 to transfer from the power OFF status to the power ON status may be determined as the input channel, instead of determining according to the priority order setting Tb or determining the image signal input I/F 103 as the input channel for which the input detector 110 detects the image signal or the input report signal the latest. According to the image projection display apparatus 1 of the embodiment thus configured, it can increase convenience for the user in switching the input channel.

When the input switching controller 140 determines the input channel in the processes of S515 through S517, the input switching controller 140 switches the input channel to the image signal input I/F 103 determined in the processes of S515 through S517 (S518). When the input switching controller 140 switches the image signal input I/F 103 in the process of S518, the input switching controller 140 analyzes and determines, based on the image related signal reported in the process of S512, whether the image file input from the image signal input I/F 103, which has been switched to as the input channel in the process of S518, is not broken or is not a file that cannot be output because of an unsupported file format, etc (S519).

If the input switching controller 140 determines in the determination process of S519 that the image file can be output (S519/YES), the image signal input controller 160 inputs to the image processor 170 the image signal from the image signal input I/F 103 which has been switched to as the input channel in the process of S518 (S520). The image processor 170 performs the conversion processes of luminance and color components, etc., on the image signal input from the image signal input controller 160 to generate an output signal and input the output signal to the optical engine controller 180 (S521). The optical engine controller 180 projects the image from the projector lens 102 on the projection surface such as a screen, etc., in an enlarged manner by controlling or driving the optical engine 101 according to the input signal input from the image processor 170. In this way, the image projection display apparatus 1 according to the embodiment ends the process in projecting the image.

On the other hand, if the input switching controller 140 in the determination process of S519 that the image file cannot be output (S519/NO), the image signal input controller 160 generates the signal for projecting the image from the optical engine 101 in the enlarged manner to inform that the file, which cannot be output, is input and the signal for displaying on the display panel 104, and input the generated signals to the image processor 170 and the operation display controller 190 (S523).

The image processor 170, as is the case with the process of S521, performs the conversion processes of luminance and color components, etc., on the image signal input from the input switching controller 140 to generate an output signal and input the output signal to the optical engine controller 180, and, as is the case with the process of S522, projects an image, which represents that the file cannot be output, from the projector lens 102 on the projection surface such as a screen, etc., in an enlarged manner (S524). The operation display controller 190 causes the display panel 104 to display information that represents that the file cannot be output (S524). In this way, the image projection display apparatus 1 according to the embodiment ends the process in projecting the image.

In this way, according to the image projection display apparatus 1 of the embodiment, if the image file input from the external device is a file that cannot be output, an image representing the fact can be displayed, and thus the user can understand the reason why the image cannot be displayed.

Further, if the power status switching controller 120 determines in the determination process of S510 that the power status is not to be switched from the power OFF status to the power ON status (S510/NO), that is to say, if the setting is set such that "even if the image file input as the image signal to be output cannot be output, the image for informing the fact is not to be displayed", the image projection display apparatus 1 is kept in the power OFF status and performs the same processes as S512 through S519 (S525 through S532).

If the power status switching controller 120 determines in the determination process of S532 (the same as S519) that the image file is not the file that cannot be output (S532/YES), the power status switching controller 120 controls the power status such that the power status is switched from the power OFF status to the power ON status (S533), as is the case with S511. When the power status switching controller 120 has switched the power status from the power OFF status to the power ON status, the image projection display apparatus 1 according to the embodiment performs the same processes as S520 through S522 (S534 through S536) to end the process in projecting the image.

On the other hand, the power status switching controller 120 determines in the determination process of S532 (the same as S519) that the image file is the file that cannot be output (S532/NO), the image projection display apparatus 1 according to the embodiment remains in the power OFF status and ends the process in projecting the image.

In this way, if the image file input from the external device is the file that cannot be output, the input of the image signal or the input report signal from the external device does not cause the image projection display apparatus 1 of the embodiment to transfer from power OFF status to the power ON status, which enables decreased power consumption.

Next, with reference to FIG. 7, a process is described which is executed when the image projection display apparatus according to the embodiment transfers from the power ON status to the power OFF status. FIG. 7 is a flowchart for explaining a process executed when the image projection display apparatus according to the embodiment of the transfers from the power ON status to the power OFF status.

As illustrated in FIG. 7, when the image projection display apparatus 1 according to the embodiment transfers from the power ON status to the power OFF status, at first, the input detector 110 detects the input end signal (S701), if all the external devices are disconnected from the image signal input I/Fs 103 so that the connection is canceled in the power ON status, the image signal is no longer input from all the external devices via the image signal input I/Fs 103, or the end report signals are input from all the external devices via the image signal input I/Fs 103. The input detector 110 generates the input end detection signal based on the detected input end signal and reports it to the power status switching controller 120 (S702).

The power status switching controller 120, when the input end detection signal is reported in the process of S702, refers to the power status switching setting stored in the power status switching setting storage 130 to determine the timing at which the power status is to be switched from the power ON status to the power OFF status (S703). At that time, the power status switching controller 120 refers to, as the power status switching setting stored in the power status switching setting storage 130, a set time from the timing of detecting the input end detection signal to the timing of switching the power status from the power ON status to the power OFF status. It is noted that whether the power status is automatically transferred from the power ON status to the power OFF status can be set by the user. Thus, the setting can be changed according to a usage manner of the user, if appropriate. Further, the set time for switching the power status from the power ON status to the power OFF status can be set by the user. Thus, the setting can be changed according to a usage manner of the user, if appropriate.

When the power status switching controller 120 determines in the process of S703 the timing of switching the power status from the power ON status to the power OFF status, the power status switching controller 120 controls such that the power status is switched from the power ON status to the power OFF status at the determined timing. In this way, the image projection display apparatus 1 according to the embodiment ends the process in transferring from the power ON status to the power OFF status.

In this way, the image projection display apparatus 1 according to the embodiment automatically transfers from the power ON status to the power OFF status, when all the external devices are disconnected therefrom in the power ON status, the image signal is no longer input from all the external devices connected thereto, or the end report signals are input from all the external devices connected thereto. Thus, it becomes possible to reduce consumption power.

Further, the image projection display apparatus 1 according to the embodiment does not immediately transfer from the power ON status to the power OFF status, even when all the external devices are disconnected therefrom in the power ON status, the image signal is no longer input from all the external devices connected thereto, or the end report signals are input from all the external devices connected thereto. Thus, even if the user performs operations or takes actions described above, a useless transfer of the power status can be prevented, which enables reducing consumption power.

As described above, the image projection display apparatus 1 according to the embodiment is configured to automatically transfer to the power ON status when the input signal from the external device connected thereto is detected in the power OFF status. Thus, according to the image projection display apparatus 1 of the embodiment, when a user desires to use the image projection display apparatus, which is in the power OFF status, to project an image, it is possible for the user to make the image projection display apparatus transfer to the power ON status without taking the trouble to perform the power on operation, which increases convenience for the user.

It is noted that in the embodiment the image projection display apparatus such as a projector, etc., is described as an example of an image output apparatus; however, a device that can output an image, such as an image output apparatus including a television receiver, a PC, a digital camera, a video camera, a display panel, etc., can be applicable. Further, in the embodiment the image output apparatus may include an apparatus which can form and output an image, such as a printer, a multiple function machine, etc.

The present application is based on Japanese Priority Application No. 2012-235931, filed on Oct. 25, 2012, the entire contents of which are hereby incorporated by reference.

What is claimed is:

1. An image output apparatus that is capable of switching between a normal status and a low power status in which consumption power is lower than that in the normal status, the image output apparatus comprising:
    an interface that is configured (a1) to be connected to an external device external to the image output apparatus, (a2) to generate a connection signal when the external device is connected to the interface, and (a3) to receive an image signal from the external device;
    a signal detector configured to detect the connection signal and the image signal;
    a power status switching storage that stores a power status switching setting having plural settings including (b1) a first power status switching setting indicating that, in response to the connection signal being detected, the low power status is to be switched to the normal power status, and (b2) a second power status switching setting indicating that, in response to the image signal being detected after the connection signal is detected, the low power status is to be switched to the normal power status; and
    a switching controller that (i) switches, when the power status switching setting is set to the first power status switching setting, the low power status to the normal power status in response to the connection signal being detected, and (ii) that switches, when the power status switching setting is set to the second power status switching setting, the low power status to the normal power status in response to the image signal being detected after the connection signal is detected,
    wherein the signal detector detects a connection of a recording medium to the interface based on the connection signal, and the switching controller keeps the low power status if the connection of the recording medium to the interface is detected in the low power status and the image signal stored in the recording medium cannot be output as an image.

2. The image output apparatus of claim 1, wherein the switching controller switches the status from the normal status to the low power status based on the detection result of the signal in the normal status.

3. The image output apparatus of claim 1, wherein the switching controller switches the status from the normal status to the low power status at a predetermined timing after the detection of the signal based on the detection result of the signal in the normal status.

4. A non-transitory computer-readable recording medium having stored therein a control program for an image output apparatus that includes an interface configured to be connected to an external device external to the image output apparatus, and that is capable of switching between a normal status and a low power status in which consumption power is lower than that in the normal status, in which the control program causes the image output apparatus to execute a process comprising:
    generating a connection signal by the interface when the external device is connected to the interface of the image output apparatus, and receiving an image signal from the external device through the interface;
    detecting the connection signal and the image signal;
    storing, in a storage device, a power status switching setting having plural settings including (b1) a first power status switching setting indicating that, in response to the connection signal being detected, the low power status is to be switched to the normal power status, and (b2) a second power status switching setting indicating that, in response to the image signal being detected after the connection signal is detected, the low power status is to be switched to the normal power status;
    switching, when the power status switching setting is set to the first power status switching setting, the low power status to the normal power status in response to the connection signal being detected, and switching, when the power status switching setting is set to the second power status switching setting, the low power status to the normal power status in response to the image signal being detected after the connection signal is detected; and
    detecting a connection of a recording medium to the interface based on the connection signal, and keeping the low power status when the connection of the recording medium to the interface is detected in the low power status and the image signal stored in the recording medium cannot be output as an image.

5. The non-transitory computer-readable recording medium of claim 4, wherein the process performed by the image output apparatus further comprises:

switching the status from the normal status to the low power status based on the detection result of the signal in the normal status.

6. The non-transitory computer-readable recording medium of claim 4, wherein the process performed by the image output apparatus further comprises:

switching the status from the normal status to the low power status at a predetermined timing after the detection of the signal based on the detection result of the signal in the normal status.

* * * * *